US012782375B2

(12) United States Patent
Meng et al.

(10) Patent No.: US 12,782,375 B2
(45) Date of Patent: Nov. 3, 2026

(54) AUTOMATIC ANALYZING APPARATUS HAVING A DETACHABLE WIRING FIXING PART

(71) Applicant: Canon Kabushiki Kaisha, Tokyo (JP)

(72) Inventors: LingCun Meng, Dalian (CN); Wei Liu, Dalian (CN); Hui Xie, Dalian (CN); Xinmin Wang, Dalian (CN); Fei Tian, Dalian (CN)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 18/499,809

(22) Filed: Nov. 1, 2023

(65) Prior Publication Data

US 2024/0142485 A1 May 2, 2024

(30) Foreign Application Priority Data

Nov. 1, 2022 (CN) ......................... 202211356956.6
Oct. 23, 2023 (JP) ................................. 2023-181873

(51) Int. Cl.
*G01N 35/10* (2006.01)
*G01N 35/00* (2006.01)

(52) U.S. Cl.
CPC ... *G01N 35/10* (2013.01); *G01N 2035/00306* (2013.01)

(58) Field of Classification Search
None
See application file for complete search history.

(56) References Cited

U.S. PATENT DOCUMENTS 8,921,095 B2 * 12/2014 Tajima .................. G01N 35/10 422/525
10,330,604 B2 * 6/2019 Konishi ................ G01N 21/82
12,135,270 B2 * 11/2024 Klas .................. G01N 15/1404
2007/0172390 A1 * 7/2007 Ootani .............. G01N 35/0099 422/64
2010/0094564 A1 * 4/2010 Kuo ................ G01N 33/48771 702/22
2015/0177267 A1 6/2015 Oonuma et al.
2018/0038881 A1 2/2018 Oonuma et al.
2022/0113329 A1 * 4/2022 Ishioka ............. G01N 35/1081
2024/0192244 A1 * 6/2024 Takahashi .......... G01N 35/1002
2026/0043818 A1 * 2/2026 Franco González ........................ B01L 3/502715

FOREIGN PATENT DOCUMENTS

CN 103543281 B * 4/2015 ............ G16B 25/20
JP 2015-121442 A 7/2015

* cited by examiner

*Primary Examiner* — Peter J Macchiarolo
*Assistant Examiner* — Jermaine L Jenkins
(74) *Attorney, Agent, or Firm* — Oblon, McClelland, Maier & Neustadt, L.L.P.

(57) ABSTRACT

An automatic analyzing apparatus according to an embodiment of the present disclosure includes a reagent storage, a reaction vessel, a placement part, and a wiring fixing part. On the placement part, at least one of the reagent storage and the reaction vessel is placed. The wiring fixing part is attached to the bottom face side of the placement part, while a wiring connected to at least one of the reagent storage and the reaction vessel is fixed to the bottom face side of the wiring fixing part. It is possible to pull out the wiring fixing part.

20 Claims, 9 Drawing Sheets

BACKGROUND ART

AUTOMATIC ANALYZING APPARATUS HAVING A DETACHABLE WIRING FIXING PART

CROSS-REFERENCE TO RELATED APPLICATIONS

This application is based upon and claims the benefit of priority from Chinese Patent Application No. 202211356956.6, filed on Nov. 1, 2022; and Japanese Patent Application No. 2023-181873, filed on Oct. 23, 2023, the entire contents of all of which are incorporated herein by reference.

FIELD

Embodiments described herein relate generally to an automatic analyzing apparatus.

BACKGROUND

An automatic analyzing apparatus is configured to perform various types of tests such as blood coagulation tests, when a test subject or liquid obtained by mixing the test subject with a reagent is poured into a container as a specimen. For this purpose, the automatic analyzing apparatus includes units such as a reagent storage, a reaction vessel, an optical measuring unit, an analyzing unit, and cleaning unit, and/or the like. Among these units, the reagent storage is a unit configured to cool and hold a plurality of reagent containers arranged in a circular formation. Each of the reagent containers in the reagent storage stores therein a reagent containing a component that reacts with a component of one of the test items contained in the specimen. As for a layout of the automatic analyzing apparatus, it is necessary that a caging element has, on the inside thereof, a space for the units and positions for arranging cables connecting the units together.

For example, in an automatic analyzing apparatus such as a conventional automatic biochemical analyzer, the frame of an apparatus caging element is primarily used for fixing all the units (e.g., a reagent storage, a reaction vessel, an optical measuring unit, an analyzing unit, a cleaning unit, and/or the like) in the apparatus and the cables for connecting the units together.

In conventional layouts, a layered structure is often used. FIG. 14 is a schematic drawing illustrating a layout inside a caging element in a conventional automatic analyzing apparatus. As illustrated in FIG. 14, on the inside of the caging element, the interior space of the caging element is primarily divided into three storage spaces, by a first supporting layer 10', a second supporting layer 30', and a third supporting layer 50' arranged from the bottom up in the stated order. In this situation, the first supporting layer 10' supports electric control units 20' configured to control functional units 60'. The second supporting layer 30' supports a reagent storage 40'. The third supporting layer 50' supports the functional units 60' such as a reaction vessel, an optical measuring unit, and the like. Further, the functional units 60', the reagent storage 40', and the electric control units 20' are connected together via cables 80' and cable connectors 81'.

With such a layout, the structure is complicated, and there are many cables because there are many fixed units. Presently, the cables 80' in a large volume are placed and fixed by cable clamps, between the second supporting layer 30' and the reagent storage 40'. For example, the cables 80' on the second supporting layer 30' each either go through a center hole penetrating the reagent storage 40' or go around the reagent storage 40', so as to be connected to the reagent storage 40' on the second supporting layer 30' or to the functional units 60' on the third supporting layer 50' being the layer positioned above. As another example, the cables 80' on the second supporting layer 30' go through an opening in the second supporting layer 30' so as to be connected to the electric control units 20' on the first supporting layer 10', which is the layer positioned underneath.

This type of layout, however, has the following problems.

First of all, because the reagent storage 40' belongs to a part that is difficult to be removed, the cables 80' present between the space under the reagent storage 40' and the second supporting layer 30' are also, indirectly, difficult to be removed.

Secondly, as illustrated in FIG. 14, the cables 80' are primarily attached above the second supporting layer 30'. For this reason, once any of the cables 80' of the apparatus is damaged, a worker needs to remove, one by one, all the units (including units that are difficult to be attached and detached, such as the reagent storage 40') placed on the second supporting layer 30' and the third supporting layer 50'. After that, the worker removes the cables 80' fixed by the cable clamps so as to replace the damaged cable 80'. In this situation, after finishing replacing and fixing the cable 80', the worker needs to install, one by one, all the removed units in the reverse order this time and to re-adjust the positions thereof. In this process, because the degree of difficulty of the operation is high, returning the apparatus to a factory for maintenance may be required, in which case, the use at an actual site such as a hospital may be impacted. In addition, in the maintenance process, because the degree of difficulty of the operation is high, a lot of time is spent, and efficiency of services is degraded.

DETAILED DESCRIPTION

Figure 1:
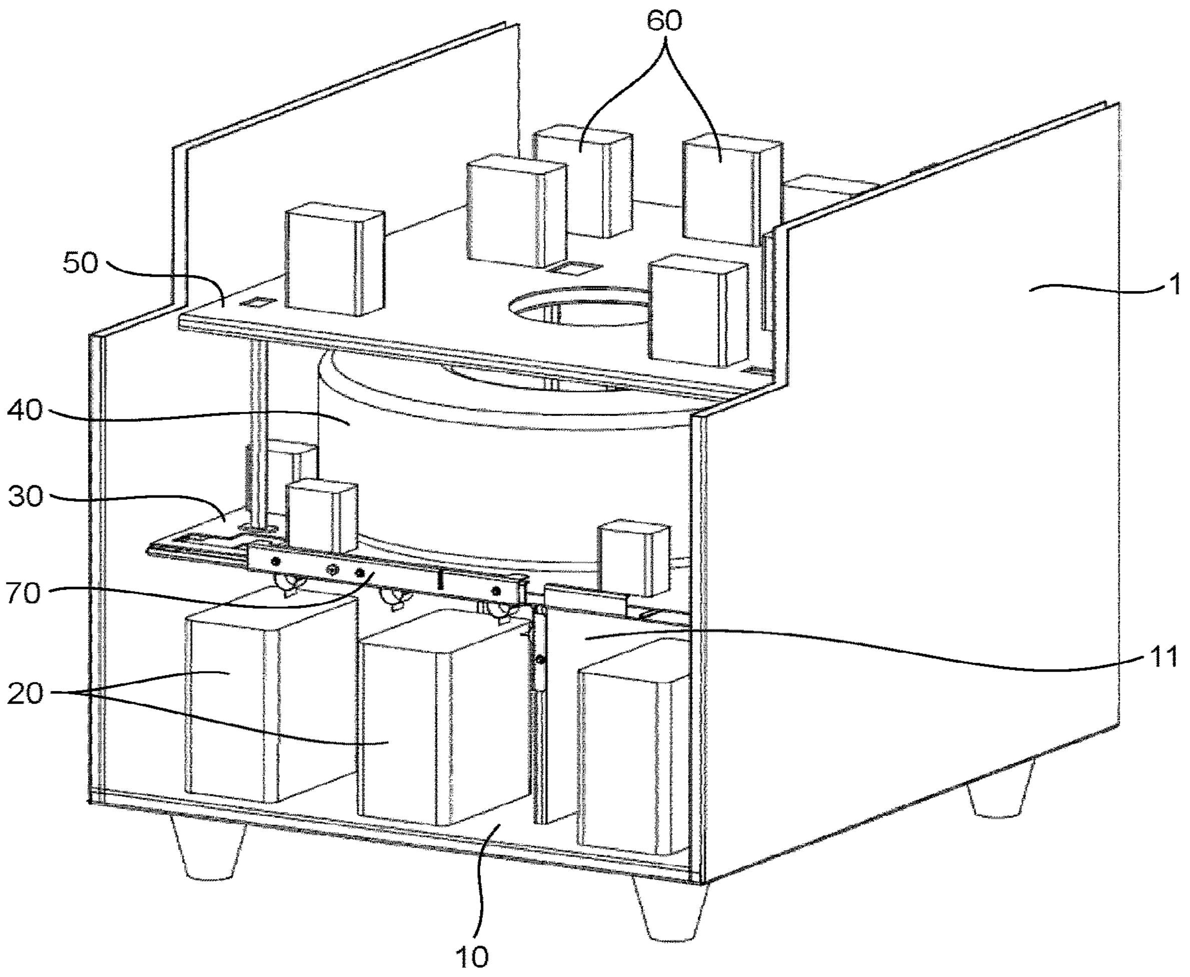
FIG. 1 is a perspective view illustrating an overall layout inside an automatic analyzing apparatus according to a first embodiment.

An automatic analyzing apparatus according to an embodiment of the present disclosure includes a reagent storage, a reaction vessel, a placement part, and a wiring fixing part. On the placement part, at least one of the reagent storage and the reaction vessel is placed. The wiring fixing part is attached to the bottom face side of the placement part, while a wiring connected to at least one of the reagent storage and the reaction vessel is fixed to the bottom face side of the wiring fixing part. It is possible to pull out the wiring fixing part.

In the following sections, exemplary embodiments of an automatic analyzing apparatus will be explained with reference to the accompanying drawings. Further, in the embodiments, some of the constituent elements that are substantially the same as each other will be referred to by using the same reference characters, and detailed explanations thereof will be omitted as appropriate.

Further, to explain the embodiments, an automatic biochemical analyzer will be used as an example of the automatic analyzing apparatus. However, possible embodiments of the present disclosure are not limited to this example. Any automatic analyzing apparatus configured to analyze a component of a test subject while using a container is applicable to the embodiments of the present disclosure.

Further, the drawings illustrate structures that are schematically depicted for the sake of convenience in the explanations. In those structures, specific dimensions of the component parts and proportional and positional relationships among various component parts may not necessarily coincide with those of actual products.

First Embodiment

FIG. 1 is a perspective view illustrating an overall layout inside an automatic analyzing apparatus according to a first embodiment. As illustrated in FIG. 1, the automatic analyzing apparatus is enclosed in a box-like caging element 1. After the caging lateral walls on the two sides opposing each other and the upper wall of the caging element 1 are removed, the layout illustrated in FIG. 1 is exhibited.

As illustrated in FIG. 1, the automatic analyzing apparatus includes a first supporting layer 10, a vertical support plate 11, electric control units 20, a second supporting layer 30, a reagent storage 40, a third supporting layer 50, functional units 60, and a wiring fixing part 70.

For example, as illustrated in FIG. 1, in the caging element 1, the first supporting layer 10, the second supporting layer 30, and the third supporting layer 50 each having a flat plate-like shape are arranged from the bottom up in the stated order. Disposed between the first supporting layer 10 and the second supporting layer 30 is the vertical support plate 11 standing upright. The interior space of the caging element 1 is divided into three storage spaces by the first supporting layer 10, the second supporting layer 30, and the third supporting layer 50. More specifically, the interior space of the caging element 1 is divided into the three primary storing spaces that are, namely, a bottom space between the first supporting layer 10 and the second supporting layer 30; a middle space between the second supporting layer 30 and the third supporting layer 50; and a top space above the third supporting layer 50.

In this situation, the plurality of functional units 60 are primarily supported by the third supporting layer 50 for the top space. These functional units 60 are modules configured to execute functions of the automatic analyzing apparatus and include, for example, a reaction vessel (not illustrated), an optical measuring unit, an analyzing unit, and a cleaning unit. The reaction vessel is configured to rotatably hold each of a plurality of reaction containers and to cause a reagent to react with the specimen in the reaction containers. The optical measuring unit is configured to emit light onto any one of the rotating reaction containers that has come to a measuring position and to carry out an optical measuring process to detect light that, due to the light emission, transmitted through the liquid mixture of the specimen and the reagent in the reaction container. The analyzing unit is configured to analyze the specimen on the basis of a result of the optical measuring process. The cleaning unit is configured to clean the reaction container on which the measuring process by the optical measuring unit has finished. Possible examples of the functional units 60 are not limited to these examples. It is possible to install necessary functional units in accordance with specific measuring processes performed by the automatic analyzing apparatus.

The reagent storage 40 is primarily placed on and supported by the second supporting layer 30 for the middle space. The reagent storage 40 is configured to cool and hold the plurality of reagent containers that are arranged in a circular formation. Each of the reagent containers in the reagent storage 40 stores therein the reagent containing a component that reacts with a component of one of the test items contained in the specimen. The second supporting layer 30 is an example of the "placement part".

The electric control units 20 configured to control the functional units 60 and the reagent storage 40 are primarily supported by the first supporting layer 10 for the bottom space. The electric control units 20 are connected to the reagent storage 40 and the functional units 60 controlled thereby, via cables and cable connectors. To realize the cable connections among the electric control units 20, the reagent storage 40, and the functional units 60, separators such as the second supporting layer 30 and the third supporting layer 50 distributed along cable connection paths are provided with openings through which the cables can pass. The cables are an example of the "wirings".

Normally, the cables connected by the cable connectors each have an extra length. Thus, within the caging element 1, the extra parts of the cables are gathered and fixed in a cable fixation region near the second supporting layer 30. More specifically, a wiring fixing part 70 having a plate-like shape is attached to the bottom face side of the second supporting layer 30, so that the wiring fixing part 70 is connected to the bottom face side of the second supporting layer 30. For example, the wiring fixing part 70 is detachably connected to the bottom face side of the second supporting layer 30 by a connecting means, while two or more of the cables are fixed to the bottom face side of the wiring fixing part 70. Details of the connecting means will be explained later.

Further, in the interior space of the automatic analyzing apparatus illustrated in FIG. 1, other members may further be installed as necessary, but other detailed explanations will be omitted. Next, a structure of the cable fixation region according to the present embodiment will primarily be explained.

Figure 2:
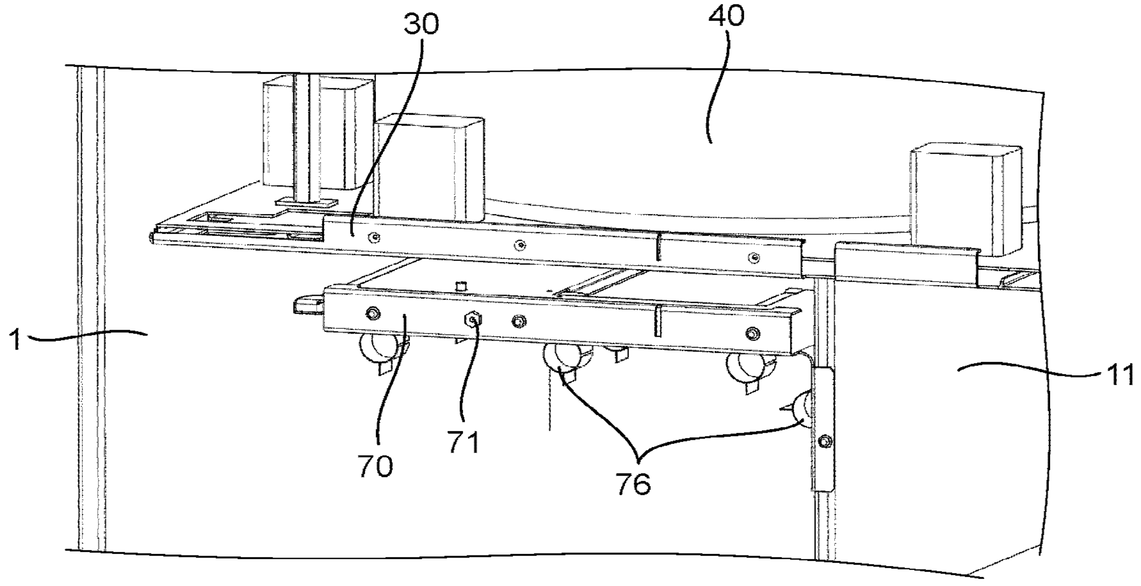
FIG. 2 is a schematic enlarged view illustrating a structure in the automatic analyzing apparatus according to the first embodiment, while a cable fixation region is partially separated.

FIG. 2 is a schematic enlarged view illustrating a structure in the automatic analyzing apparatus according to the first embodiment, while the cable fixation region is partially separated.

The second supporting layer 30 and the wiring fixing part 70 are both plate-like members and laid over each other in the up-and-down direction when being attached. Further, the second supporting layer 30 and the wiring fixing part 70 each have an edge rolled upward on mutually the same side so as to be joined together and fixed via the edges by using screws. In addition, the side of the wiring fixing part 70 positioned close to the vertical support plate 11 is bent downward, so as to be joined with the vertical support plate 11 by using screws.

FIG. 2 illustrates a state in which the second supporting layer 30 and the wiring fixing part 70 are separated. As illustrated in FIG. 2, the reagent storage 40 is fixed to the top face side of the second supporting layer 30, while the bottom face side of the second supporting layer 30 is facing the wiring fixing part 70.

On the top face side thereof facing the second supporting layer 30, the wiring fixing part 70 is provided with guiding rails that can be fitted with the second supporting layer 30. In addition, at least one of the sides of the wiring fixing part 70 is provided with the edge rolled upward. The edge is provided with holes so as to be screwed together with the edge of the second supporting layer 30 provided on the same side. Further, a weld nut 71 for conveniently cancelling contact is provided on the edge, in the direction toward the exterior of the caging element 1. When the edges of the second supporting layer 30 and the wiring fixing part 70 provided on the certain side are tightly coupled together, it is possible to conveniently and mildly cancel the coupled state between the second supporting layer 30 and the wiring fixing part 70, by screwing a screw into the weld nut 71.

Further, in FIG. 2, on the bottom face side thereof, the wiring fixing part 70 is further provided with a plurality of cable clamps 76 for fixing the cables. The cable clamps 76 may arbitrarily be distributed and are primarily used for fixing the cables onto the bottom face side of the wiring fixing part 70. The cable clamps 76 in the present example are merely an example of various methods for fixing the cables. It is therefore acceptable to fix the cables by using other fixing methods.

Figure 3:
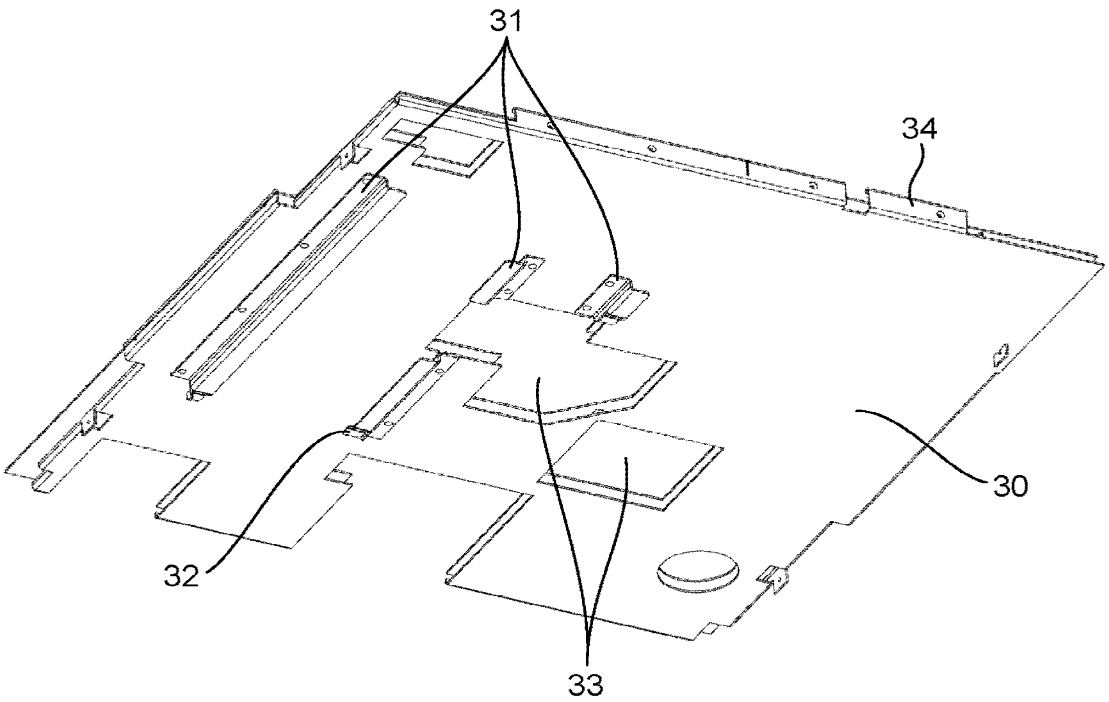
FIG. 3 is a schematic drawing illustrating a structure of a second supporting layer in the automatic analyzing apparatus according to the first embodiment.

FIG. 3 is a schematic drawing illustrating a structure of the second supporting layer in the automatic analyzing apparatus according to the first embodiment. FIG. 3 illustrates the rear surface side (the bottom face side) of the second supporting layer 30 with an angle of view to look at the second supporting layer 30 from the bottom. The second supporting layer 30 has a plate-like shape as a whole and has a supporting layer edge 34 rolled upward on one of the sides, while the supporting layer edge 34 has a plurality of holes into which screws can be attached. On the rear surface side of the second supporting layer 30, a plurality of guiding grooves 31 are fixed. A position determining slope 32 is provided at the distal end, in terms of the advancement direction, of each of the guiding grooves 31. Further, the second supporting layer 30 further has openings 33 through which the cables can pass.

Figure 4:
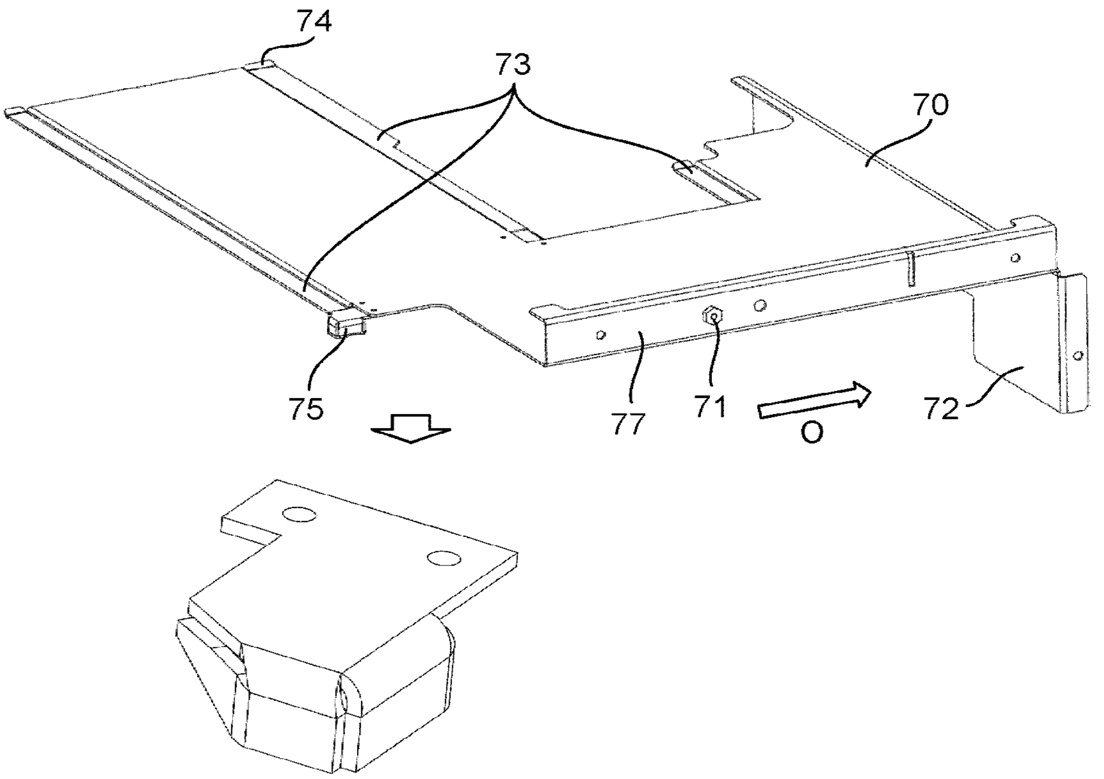
FIG. 4 is a schematic drawing illustrating a structure of a wiring fixing part in the automatic analyzing apparatus according to the first embodiment.

FIG. 4 is a schematic drawing illustrating a structure of the wiring fixing part in the automatic analyzing apparatus according to the first embodiment. FIG. 4 illustrates a state of the wiring fixing part 70 with an angle of view to look at the wiring fixing part 70 from diagonally above. The wiring fixing part 70 has a plate-like shape as a whole and has a wiring fixing part edge 77 rolled upward on one of the sides in correspondence with the supporting layer edge 34. In this situation, because the wiring fixing part edge 77 has a plurality of holes into which screws can be attached, it is possible to tighten the supporting layer edge 34 and the wiring fixing part edge 77 together by using the screws. Another side extending perpendicularly to the wiring fixing part edge 77 is bent downward so as to form a bent part 72. The bent part 72 is connected to the vertical support plate 11.

Further, the wiring fixing part 70 has a plurality of guiding rails 73 in positions corresponding to the guiding grooves 31 on the second supporting layer 30. One or more of the guiding rails 73, of which the two ends are both open, are each provided with a support metal sheet 75 at an end thereof positioned close to the wiring fixing part edge 77. As illustrated in the enlarged view indicated with an arrow in the bottom section of FIG. 4, the support metal sheet 75 is a metal sheet member having a slope on the side thereof facing the guiding rails 73 and is configured to be able to enhance a support strength of the rear end of the guiding rail being open.

One or both of the guiding grooves 31 and the guiding rails 73 have, in at least one end part thereof, a position restricting means for restricting sliding of the guiding rails 73 in the guiding grooves 31. In the examples illustrated in FIGS. 3 and 4, a slope 74 is provided at a second end of each of the guiding rails 73 so that when the guiding rails 73 slide in the guiding grooves 31, the slopes 74 are caused to abut against the position determining slopes 32 so as to determine the positions by restricting the sliding of the guiding rails 73. The slopes 74 and the position determining slopes 32 are examples of the "position restricting means".

In the first embodiment, the example is explained in which the slope is provided at the distal end of each of the guiding rails and at the basal end of each of the guiding grooves, while all the guiding rails that are of an open type are each provided with the support metal sheet. However, the installation of the support metal sheets 75, the slopes 74, and the position determining slopes 32 may be carried out as necessary. It is acceptable to provide only one of these elements. It is also acceptable to omit the installation.

Figure 5:
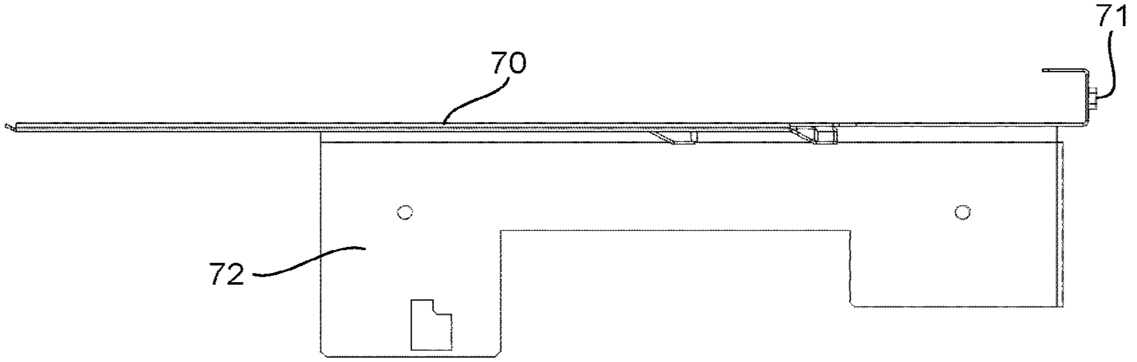
FIG. 5 is a side view of the wiring fixing part, as viewed along the direction of an arrow 0 in FIG. 4.

FIG. 5 is a side view of the wiring fixing part, as viewed along the direction of the arrow 0 in FIG. 4. In this situation, in an example of the form of the bent part 72 of the wiring fixing part 70, it is acceptable to provide an opening through which a cable can pass, as illustrated in the drawing. Needless to say, the form of the bent part 72 may arbitrarily be designed so long as the space permits. For example, when the caging element of the automatic analyzing apparatus is not provided with the vertical support plate 11, it is acceptable to omit providing the bent part 72. When the bent part 72 is provided, it is also possible to fix one or more of the cables, by providing a cable clamp 76 on the inside of the bent part 72.

The wiring fixing part 70 and the second supporting layer 30 are connected together by the connecting means of which the connection state can be cancelled. In the present example, a guiding rail mechanism is used as the connecting means. For example, the connecting means includes: the guiding rails 73 fixed to one of the wiring fixing part 70 and the placement part (the second supporting layer 30); and the guiding grooves 31 fixed to the other of the two. In the example illustrated in FIGS. 2 to 5, the guiding rails 73 are provided on the face of the wiring fixing part 70 opposing the second supporting layer 30. The guiding grooves 31 are provided on the face of the second supporting layer 30 opposing the wiring fixing part 70. Alternatively, the guiding grooves 31 may be provided on the face of the wiring fixing part 70 opposing the second supporting layer 30, whereas the guiding rails 73 may be provided on the face of the second supporting layer 30 opposing the wiring fixing part 70. As a result, in the example illustrated in FIGS. 2 to 5, the guiding rails 73 on the wiring fixing part 70 are able to smoothly slide along the guiding grooves 31, so that it is possible to freely switch the wiring fixing part 70 between a state of being coupled with the second supporting layer 30 and another state of being pulled out of the second supporting layer 30. The guiding rails 73 and the guiding grooves 31 are examples of the "connecting means".

Of the above, when the guiding rails 73 are inserted and slid along the guiding grooves 31 and are subsequently fixed to the second supporting layer 30, the wiring fixing part 70 goes into the state of being coupled with the second supporting layer 30.

Figure 6A:
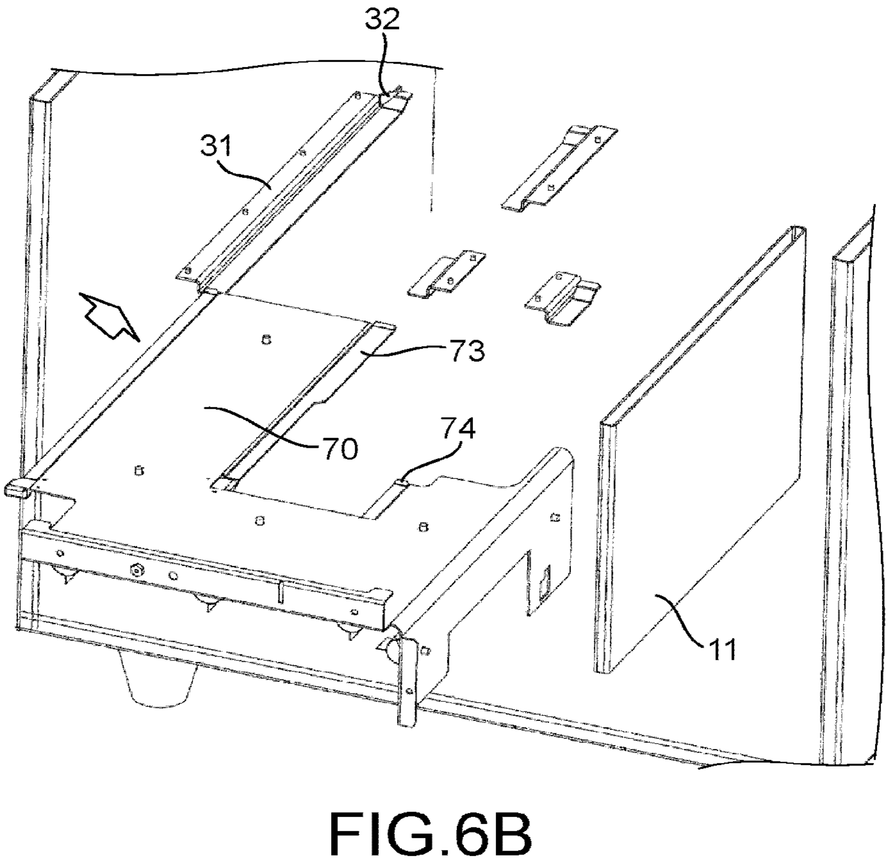
FIG. 6A is a schematic drawing illustrating a process of inserting the wiring fixing part, within the automatic analyzing apparatus according to the first embodiment.
Figure 6B:
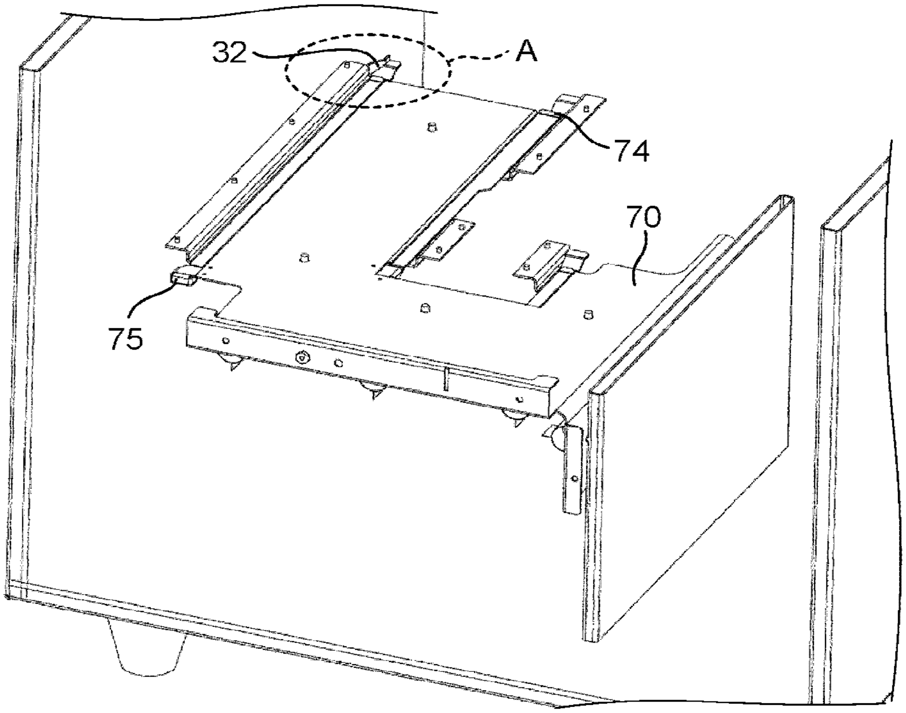
FIG. 6B is a schematic drawing illustrating the inserted state the wiring fixing part, within the automatic analyzing apparatus according to the first embodiment.

FIG. 6A is a schematic drawings illustrating the process of inserting the wiring fixing part 70, within the automatic analyzing apparatus according to the first embodiment. FIG. 6B is a schematic drawing illustrating the inserted state the wiring fixing part 70, within the automatic analyzing apparatus according to the first embodiment. To clearly indicate sliding paths of the guiding rails 73, the main body part of the second supporting layer 30 and the cables are not depicted in FIGS. 6A and 6B, while only the section corresponding to the guiding grooves 31 on the second supporting layer 30 remains depicted.

At the time of attaching the wiring fixing part 70 to the second supporting layer 30, at first, the cables are fixed to the wiring fixing part 70. After that, the guiding rails 73 on the wiring fixing part 70 to which the cables are fixed are fitted into the guiding grooves 31 on the second supporting layer 30, so as to cause the guiding rails 73 to slide in the guiding grooves 31, by pressing the wiring fixing part 70 along the direction of the arrow, as illustrated in FIG. 6A.

Figure 7:
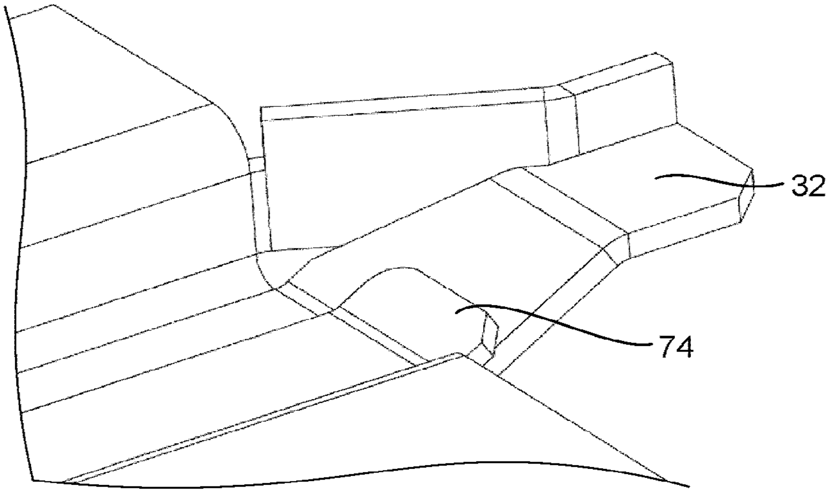
FIG. 7 is a schematic drawing illustrating a position determining means in the automatic analyzing apparatus according to the first embodiment.

Subsequently, as a result of pressing the wiring fixing part 70 forward so as to keep the wiring fixing part 70 moving, the wiring fixing part 70 reaches the position illustrated in FIG. 6B, so that the slopes 74 at the distal ends of the guiding rails 73 come into contact with the position determining slopes 32 on the guiding grooves 31. FIG. 7 illustrates, in an enlarged view, a mechanism in which a slope 74 is in contact with a position determining slope 32, as the position determining means. As illustrated in FIG. 7, because of the contact made between the slope 74 and the position determining slope 32, it is possible to determine the position of the guiding rail 73 in the advancement direction of the guiding rail 73 and in the direction horizontally perpendicular to the advancement direction.

In this situation, the wiring fixing part edge 77 is in proximity to the supporting layer edge 34. Fixing-purpose screws are attached between the wiring fixing part edge 77 and the supporting layer edge 34, so as to paste and tighten the two together and to also tighten the bent part 72 and the vertical support plate 11 together by using screws, and the attachment of the wiring fixing part 70 is thus completed. In this state, the bottom face side of the second supporting layer 30 and the top face side of the wiring fixing part 70 are in contact with each other, while the wiring fixing part edge 77 and the supporting layer edge 34 are in contact with each other.

Figure 8:
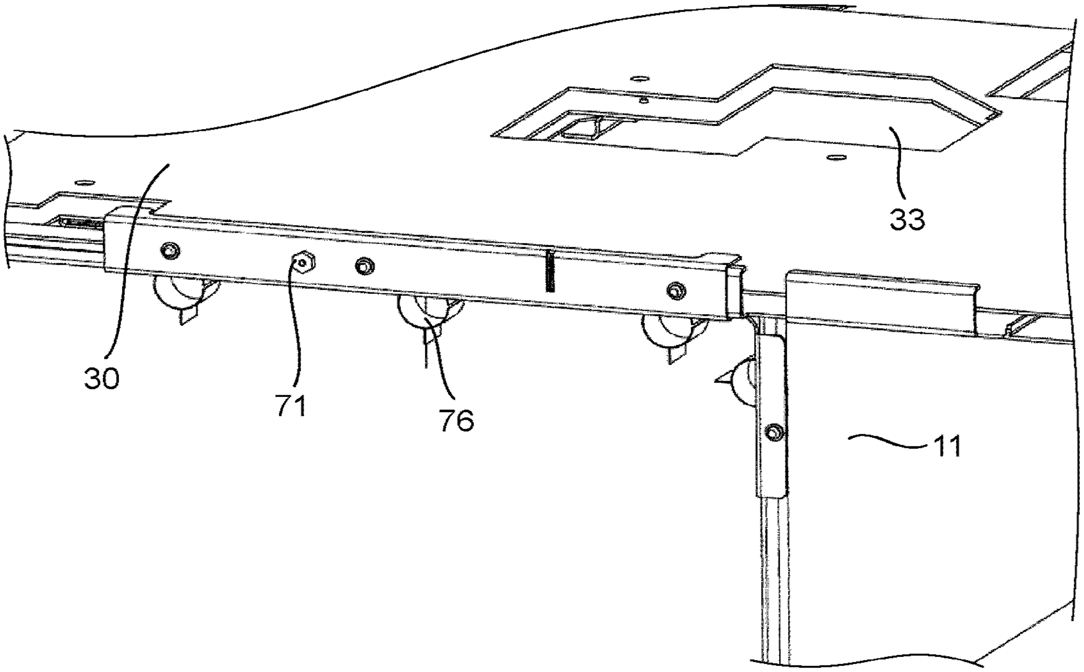
FIG. 8 is a schematic enlarged view illustrating a structure in the automatic analyzing apparatus according to the first embodiment as viewed from diagonally above, while the cable fixation region is in a coupled state.
Figure 9:
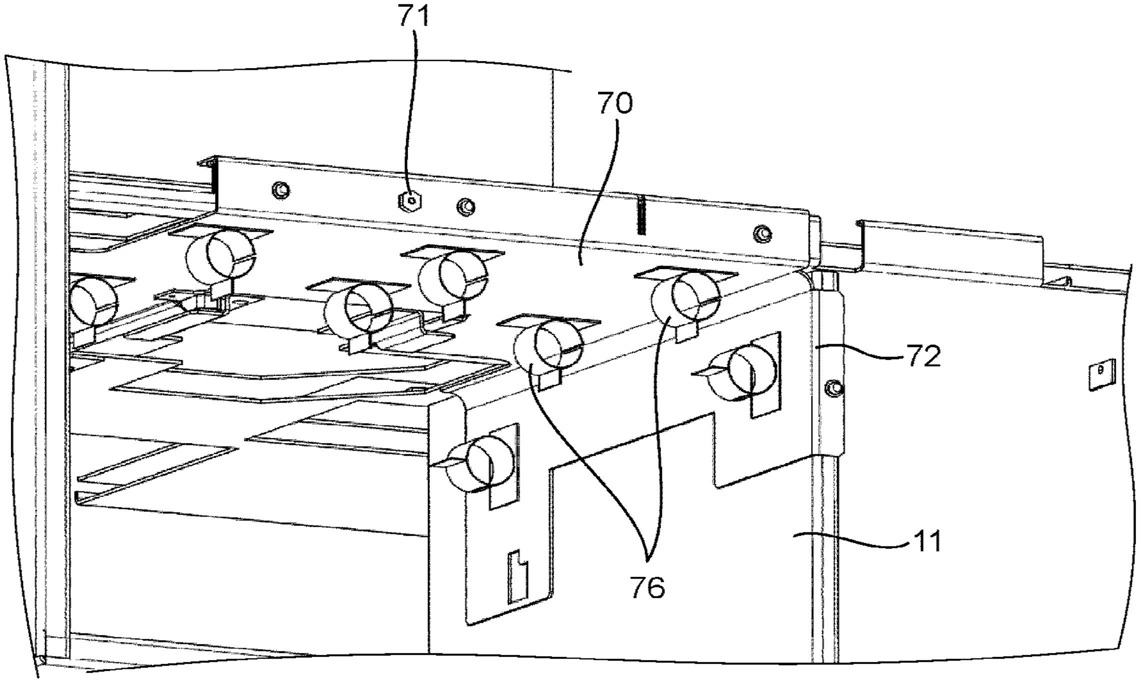
FIG. 9 is a schematic enlarged view illustrating, with a different angle of view, the structure in the automatic analyzing apparatus according to the first embodiment as viewed from diagonally underneath, while the cable fixation region is in the coupled state.

FIG. 8 is a schematic enlarged view illustrating the structure as viewed from diagonally above on the wiring fixing part edge 77 side, while the cable fixation region is in a coupled state. FIG. 9 is a schematic enlarged view illustrating, with a different angle of view, the structure as viewed from diagonally underneath on the wiring fixing part edge 77 side, while the cable fixation region is in the coupled state. As illustrated in the drawings, as a result of coupling together the wiring fixing part edge 77 and the supporting layer edge 34, the second supporting layer 30 is pasted together with the wiring fixing part 70, so that the cables fixed to the cable clamps 76 on the bottom face side of the wiring fixing part 70 are arranged in a compact manner in the space underneath the second supporting layer 30. After the attachment of the wiring fixing part 70 is finished, it is possible to connect the cables to the corresponding cable connectors and units.

Further, pulling out the wiring fixing part 70 from the guiding grooves 31 realizes a state in which the wiring fixing part 70 and the second supporting layer 30 are separate from each other or a state in which the cables are removable.

Figure 10:
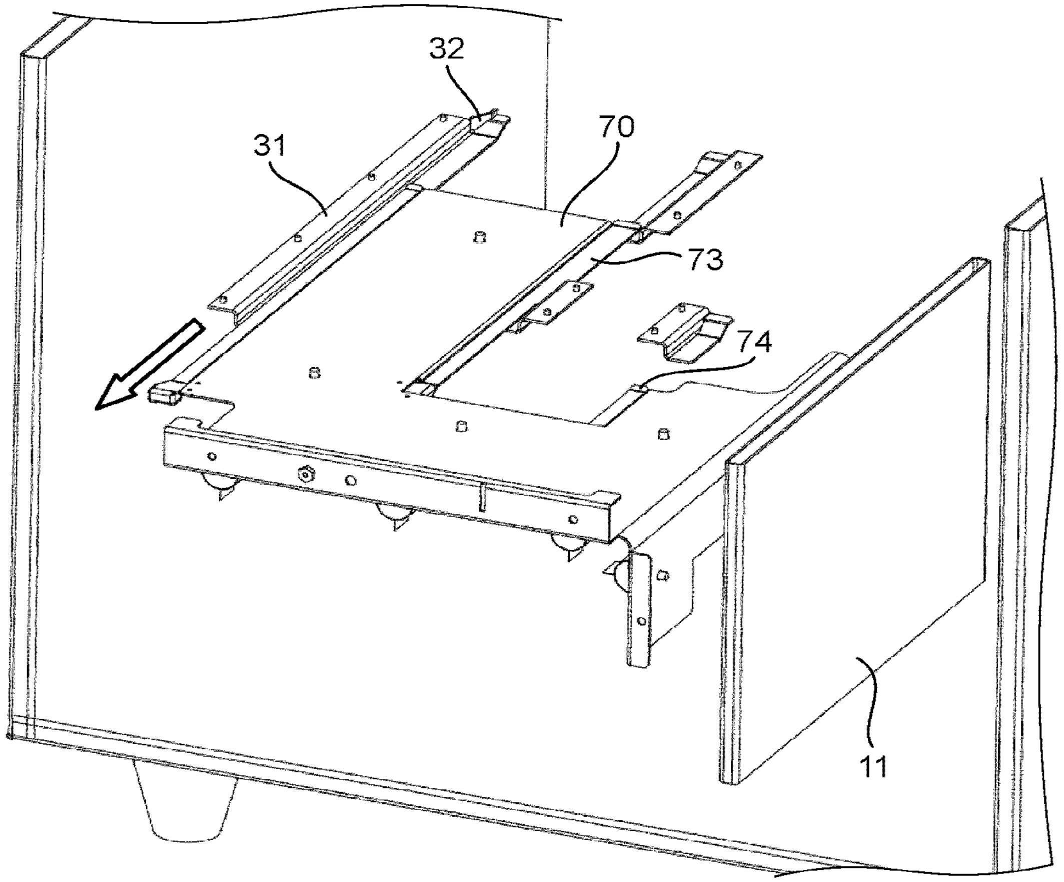
FIG. 10 is a schematic drawing illustrating a process of pulling out the wiring fixing part, in the automatic analyzing apparatus according to the first embodiment.

FIG. 10 is a schematic drawing illustrating a process of pulling out the wiring fixing part 70, in the automatic analyzing apparatus according to the first embodiment. When it is necessary to replace or perform maintenance on one or more of the cables and to pull out the wiring fixing part 70, at first, the cables are disconnected from the corresponding cable connectors and units. Secondly, after all the screws are removed, a removal screw (not illustrated) is screwed into the weld nut 71, so as to bring the tip end of the removal screw into contact with the second supporting layer 30, so that the wiring fixing part 70 is separated from the second supporting layer 30 in the screwing direction of the removal screw, as the removal screw is continuously screwed in. The removal screw is a screw capable of separating the wiring fixing part 70 and the second supporting layer 30 from each other, when being screwed into the weld nut 71. It is acceptable to use a screw connecting together the wiring fixing part 70 and the second supporting layer 30, directly as the removal screw. Alternatively, it is also acceptable to prepare the removal screw separately. When the removal screw is not used, a screw connecting together the wiring fixing part 70 and the second supporting layer 30 may be provided in an arbitrary position.

After the wiring fixing part 70 and the second supporting layer 30 are separated from each other, the guiding rails 73 slide in the guiding grooves 31 along the direction of the arrow in FIG. 10, so that the wiring fixing part 70 is pulled out. Accordingly, it is possible to perform cable attaching and detaching work only on the wiring fixing part 70 that has been pulled out.

As explained above, the wiring fixing part 70 includes the wiring fixing part edge 77 of which a first side is pasted together with the placement part (the second supporting layer 30), while the weld nut 71 is fixed to a second side of the wiring fixing part edge 77. The weld nut 71 is capable, when the removal screw is screwed therein, of separating the wiring fixing part 70 and the second supporting layer 30 from each other. In other words, by using the weld nut 71, it is possible to avoid the problem where the cables may be damaged by excessive force at the time of removal and to thus protect the cables attached to the wiring fixing part 70. Alternatively, the weld nut 71 may be omitted, so as to directly perform the removal process manually. The wiring fixing part edge 77 is an example of the "paste plane".

Figure 12A:
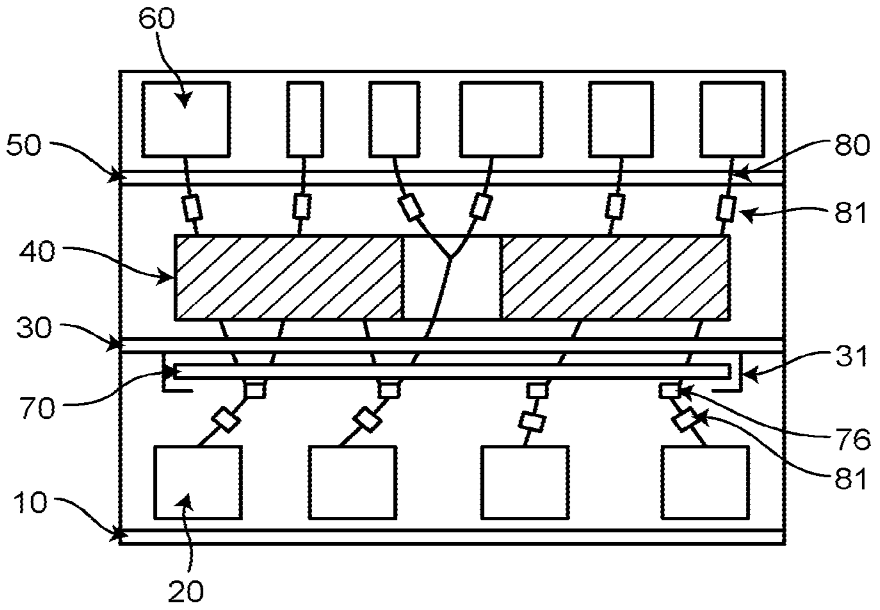
FIG. 12A is a schematic front view illustrating a wiring layout in the automatic analyzing apparatus according to the first embodiment.
Figure 12B:
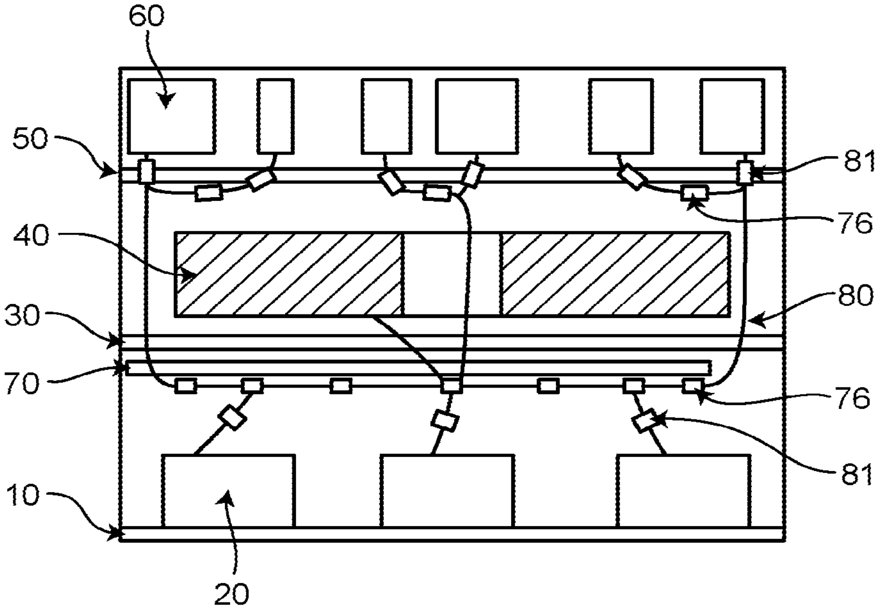
FIG. 12B is a schematic side view illustrating the wiring layout in the automatic analyzing apparatus according to the first embodiment.

Next, a wiring layout while the wiring fixing part 70 is in the attached state will briefly be explained. FIG. 12A is a schematic front view illustrating a wiring layout in the automatic analyzing apparatus according to the first embodiment. FIG. 12B is a schematic side view illustrating the wiring layout in the automatic analyzing apparatus according to the first embodiment.

As illustrated in FIGS. 12A and 12B, in the caging element 1, the first supporting layer 10, the second supporting layer 30, and the third supporting layer 50 are arranged from the bottom up in the stated order. The electric control units 20 configured to control the functional units 60 are supported by the first supporting layer 10. The reagent storage 40 is fixed to and supported by the second supporting layer 30. On the bottom face side of the second supporting layer 30, the wiring fixing part 70 is attached by using the guiding grooves 31. On the bottom face side of the wiring fixing part 70, the cables are fixed by using the cable clamps 76.

The functional units 60 such as the reaction vessel, the optical measuring unit, and/or the like are supported by the third supporting layer 50. Among those, the connections between the functional units 60, the reagent storage 40, and the electric control units 20 are realized via the cables 80 and the cable connectors 81.

The cables 80 are connected by using the cable connectors 81. In the up-and-down direction, there are primarily three types of wirings (1), (2), and (3) as follows: (1) The cables connected to the functional units 60 pass the surroundings of the reagent storage 40, go through the openings 33 (see FIGS. 3 and 8) formed in the second supporting layer 30, so as to extend to and be fixed onto the bottom face side of the wiring fixing part 70 and so as to further extend downward to be connected to the electric control units 20; (2) The cables connected to the functional units 60 pass through the center hole in the reagent storage 40 and go through the openings 33 formed in the second supporting layer 30, so as to extend to and be fixed onto the bottom face side of the wiring fixing part 70 and so as to further extend downward to be connected to the electric control units 20; (3) The cables connected to the reagent storage 40 go through the openings 33 formed in the second supporting layer 30 so as to extend to and be fixed onto the bottom face side of the wiring fixing part 70. The cables further extend downward to be connected to the electric control units 20 or pass through the center hole in the reagent storage 40 so as to go through the openings formed in the third supporting layer 50 and be connected upward to the functional units 60.

In the cable layout illustrated in FIGS. 12A and 12B, when any of the cables 80 is damaged and requires maintenance, a worker at first removes the connectors between the units and the cables 80 and pulls out the wiring fixing part 70. Subsequently, the worker removes the damaged cable fixed by a cable clamp 76, replaces the damaged cable with a new cable 80, and has the new cable 80 fixed. After that, the worker attaches the wiring fixing part 70 into the guiding grooves, presses and returns the wiring fixing part 70 to the bottom face side of the second supporting layer 30, and subsequently connects the new cable 80 to the connectors for the units. In this manner, it is possible to conveniently replace any of the cables 80 in a short work period.

The wiring layout in FIGS. 12A and 12B is merely an example of possible cable arrangements. For example, it is possible to arbitrarily design a layout in accordance with specific shapes of the supporting layers and the wiring fixing part 70 and connections required among the units. It is also possible to guide extra parts of the cables 80 to the bottom face side of the wiring fixing part 70 so as to be fixed there. With these arrangements, it is possible to modularize the cables 80. Further, the modularization and attachment methods of the cables 80 are applicable not only to automatic analyzing apparatuses, but also to other modalities such as Computed Tomography (CT) apparatuses, Magnetic Resonance Imaging (MRI) apparatuses, and the like.

According to the first embodiment, the cables 80 are fixed to the wiring fixing part 70 that is removable from the structure (the second supporting layer 30 serving as the placement part) to which the reagent storage 40 is fixed. On the bottom face side of the wiring fixing part 70 attached to the bottom face side of the second supporting layer 30, the cables 80 connected to the reagent storage 40 are fixed, while it is possible to pull out the wiring fixing part 70. With these arrangements, in the first embodiment, a modularized fixation design that is removable is applied to the cable fixing means, so as to make the removable convenient. In the first embodiment, under conditions where the space requirement is satisfied, it is possible to replace any of the cables 80 being damaged by simply pulling out the wiring fixing part 70, without the need to return the apparatus to a factory for maintenance. It is therefore possible to save the workers time to perform maintenance on the apparatus and to thus enhance efficiency of the services.

Modification Examples of First Embodiment

In the first embodiment, the guiding rails 73 and the guiding grooves 31 are used as the connecting means (the guiding rails 73 and the guiding grooves 31) between the second supporting layer 30 and the wiring fixing part 70. With this configuration, it is possible to reduce vibration in a transporting process and to tighten the joining of the wiring fixing part and the third supporting layer. It is sufficient when the guiding grooves 31 are provided on one of the second supporting layer 30 and the wiring fixing part 70, while the guiding rails 73 are provided on the other of the two.

However, possible connecting means are not limited to this example. For instance, it is also possible to use other connecting structures such as engagement structures.

Figure 11:
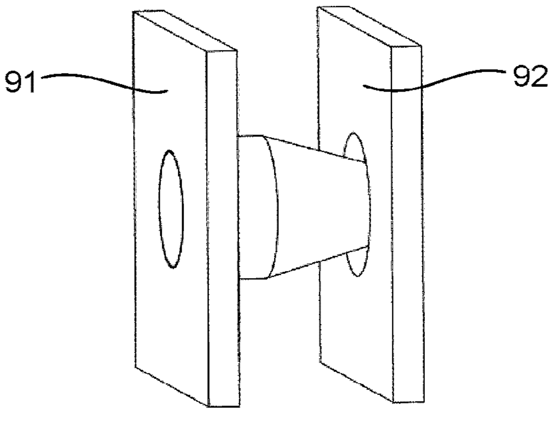
FIG. 11 is a schematic drawing illustrating a modification example of the position determining means in the automatic analyzing apparatus.

In the first embodiment, it is possible to determine the positions by using the position determining slopes 32 of the guiding grooves 31 and the slopes 74 of the guiding rails 73; however, possible embodiments are not limited to this example. For instance, FIG. 11 is a schematic drawing illustrating a modification example of the position determining means in the automatic analyzing apparatus. It is also acceptable to provide one of a position determining pin 91 and a position determining hole 92 at an end part of at least one of the guiding grooves 31, and to further provide the other of the two at an end part of at least one of the guiding rails 73, so as to determine the position by fitting the position determining pin 91 and the position determining hole 92 with each other.

Further, the shapes of the second supporting layer 30 and the wiring fixing part 70 may be modified in accordance with spaces and wiring methods in various types of automatic analyzing apparatuses. For example, in the first embodiment, the second supporting layer 30 has the supporting layer edge 34, whereas the wiring fixing part 70 has the wiring fixing part edge 77; however, any of these members may be omitted as appropriate, depending on the fixing method being used.

Further, in the first embodiment, to keep the spaces compact, the wiring fixing part 70 is connected to the second supporting layer 30 by the connecting means, so as to be attached to the second supporting layer 30; however, the present embodiments are not limited to this example. For instance, it is also possible to connect the wiring fixing part 70 to a lateral wall of the caging element 1, instead of to the second supporting layer 30, by using a connecting means. It is sufficient as long as the wiring fixing part 70 is provided on the bottom face side of the second supporting layer 30, and the wiring fixing part 70 does not necessarily have to be in contact with the second supporting layer 30. In that situation, for example, by providing the guiding grooves 31 on the lateral wall of the caging element 1, it is possible to pull out the wiring fixing part 70 relative to the lateral wall of the caging element 1 and the second supporting layer 30.

Further, in the first embodiment, optimizing the cable fixing structure (the wiring fixing part 70) in the automatic analyzing apparatus was explained; however, the present embodiments are not limited to this example. For instance, it is also possible to apply the cable fixing structure to a tube fixing structure for transporting gas or fluid in an automatic analyzing apparatus or another apparatus besides automatic analyzing apparatuses. In those situations, the cables in the above embodiments corresponds to tubes.

Further, in the first embodiment, the example was explained in which the reagent storage 40 is placed on the placement part (the second supporting layer 30); however, the present embodiments are not limited to this example. For instance, because the reaction vessel is also a unit that is difficult to be removed, the wiring fixing part 70 may be attached to the bottom face side of the third supporting layer 50 on which the reaction vessel is placed. In that situation, on the third supporting layer 50, the cables fixed to the bottom face side of the wiring fixing part 70 are the cables connected to the reaction vessel. On the second supporting layer 30, the cables fixed to the bottom face side of the wiring fixing part 70 are the cables connected to the reagent storage 40. Alternatively, the reagent storage 40 and the reaction vessel may be placed on the second supporting layer 30. In that situation, on the second supporting layer 30, the cables fixed to the bottom face side of the wiring fixing part 70 are the cables connected to the reagent storage 40 and to the reaction vessel.

As explained above, the automatic analyzing apparatus according to the present embodiment includes the reagent storage 40, the reaction vessel, the placement part (the second supporting layer 30), and the wiring fixing part 70. On the placement part (the second supporting layer 30), at least one of the reagent storage 40 and the reaction vessel is placed. The wiring fixing part 70 is attached to the bottom face side of the second supporting layer 30. The wiring (the cable) connected to at least one of the reagent storage 40 and the reaction vessel is fixed to the bottom face side of the wiring fixing part 70. It is possible to pull out the wiring fixing part 70. With these arrangements, according to the present embodiment, the reagent storage 40 and the cables are each fixed to a different one of the separate plates (the second supporting layer 30 and the wiring fixing part 70), while the cables are fixed to the bottom face side of the second supporting layer 30. Consequently, in the present embodiment, by simply pulling out the wiring fixing part 70, it is possible to perform maintenance work such as replacing one or more of the cables, without the need to remove the other units such as the reagent storage 40. Further, in the present embodiment, it is possible to realize the modularization of the cable attachment in the whole machine, to reduce maintenance time on damaged cables, and to also enhance efficiency of the services. Furthermore, in the present embodiment, it is possible to significantly save assemble time of the apparatus at a factory and to save production costs of the apparatus.

Second Embodiment

In a second embodiment, primary differences from the first embodiment lie in that a plurality of wiring fixing parts 70 are provided, so as to form a plurality of modules by fixing the cables to the bottom face side of the mutually-different wiring fixing parts 70 according to attributes thereof.

Figure 13:
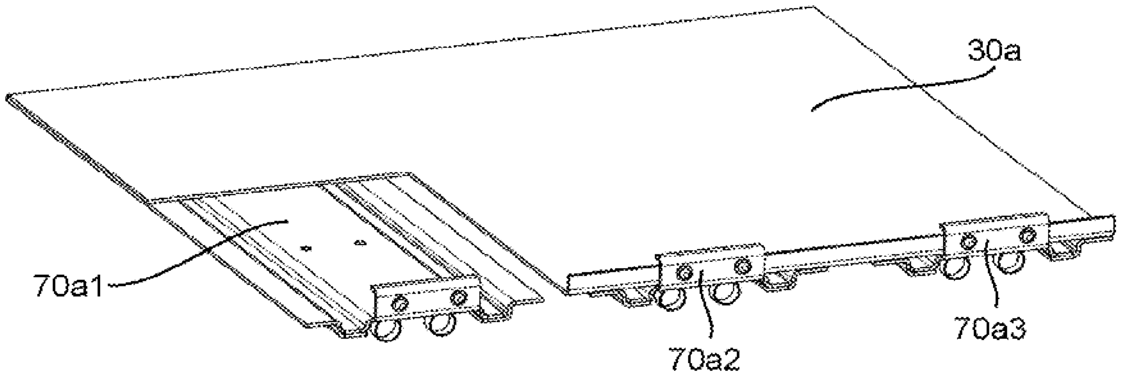
FIG. 13 is a schematic drawing illustrating structures of a placement part and a wiring fixing part in an automatic analyzing apparatus according to a second embodiment.
Figure 14:
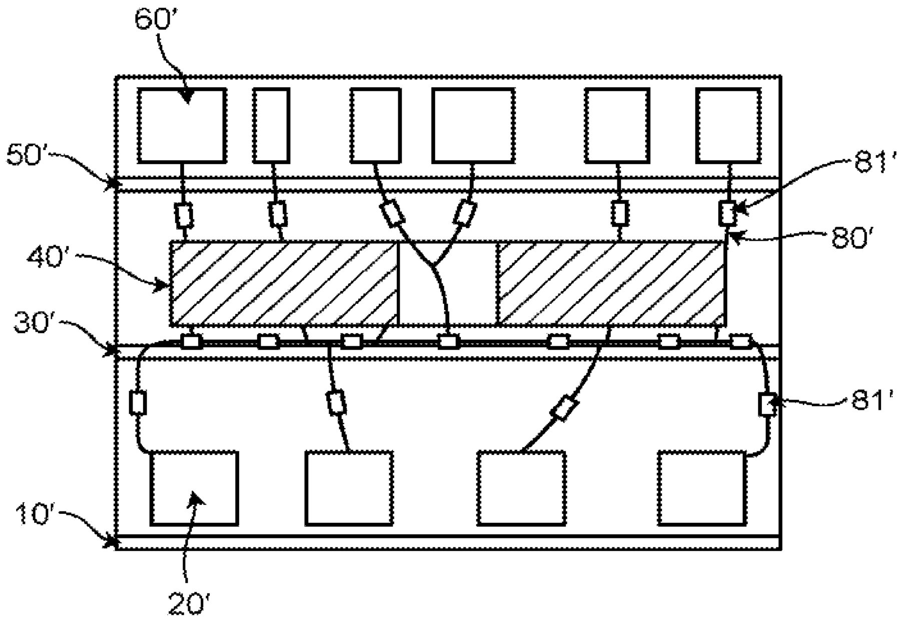
FIG. 14 is a schematic drawing illustrating a wiring layout in an automatic analyzing apparatus according to a conventional technique.

FIG. 13 is a schematic drawing illustrating structures of a placement part and a wiring fixing part in an automatic analyzing apparatus according to the second embodiment. FIG. 13 primarily illustrates a configuration part of a cable fixation region in a focused manner. For the other structures, the structure of the automatic biochemical analyzer according to the first embodiment may be referenced. Alternatively, suitable changes may be made in accordance with various types of automatic analyzing apparatuses.

An automatic analyzing apparatus according to the second embodiment includes a placement part 30*a* and wiring fixing parts 70*a*1, 70*a*2, and 70*a*3. The placement part 30*a* corresponds to the second supporting layer 30 in the first embodiment. Further, the wiring fixing parts 70*a*1, 70*a*2, and 70*a*3 correspond to the wiring fixing part 70 in the first embodiment. In other words, the wiring fixing part 70 corresponds to the plurality of wiring fixing parts (70*a*1, 70*a*2, and 70*a*3) that are separate.

In the present example, FIG. 13 illustrates a configuration of the wiring fixing part 70*a*1 while a part of the placement part 30*a* is eliminated from the depiction. Like the wiring fixing part 70 in the first embodiment, the wiring fixing part 70*a*1 similarly has the guiding rails 73 and the wiring fixing part edge 77. On the rear surface of the placement part 30*a*, a plurality of guiding grooves are provided respectively in correspondence with the wiring fixing parts 70*a*1, 70*a*2, and 70*a*3. The plurality of guiding grooves correspond to the guiding grooves 31 in the first embodiment. In this configuration, similarly to the first embodiment, the wiring fixing parts 70*a*1, 70*a*2, and 70*a*3 are attached to the placement part 30*a*, by using the method employing the guiding rails 73.

Further, because the wiring fixing parts 70*a*2 and 70*a*3 each have the same structure as the wiring fixing part 70*a*1, details explanations thereof will be omitted. Needless to say, the wiring fixing parts 70*a*1, 70*a*2, and 70*a*3 may be configured to have mutually-different structures.

Further, when the cables are laid out, in accordance with the attributes, cables having mutually-different attributes are fixed to the bottom face side of mutually-different wiring fixing parts. The attributes may be distinguished from one another according to any of the following: the functional units 60 to which the cables are connected being different; purposes of the units to which the cables are connected being different; attachment positions of the units to which the cables are connected being different; types of cables/piping being different; replacement frequency of the cables being different.

For example, it is possible to specify one of the wiring fixing parts 70a1, 70a2, and 70a3 used for fixing a cable, depending on the product life span of each cable. For instance, in the example illustrated in FIG. 13, it is possible to fix a cable of which the product life span is five years to the wiring fixing part 70a1, to fix another cable of which the product life span is seven years to the wiring fixing part 70a2, and to fix yet another cable of which the product life span is 11 years to the wiring fixing part 70a3.

As explained herein, by simply pulling out the wiring fixing part corresponding to a certain attribute on the basis of the various attributes, it is possible to replace any of the cables having the corresponding attribute.

According to the second embodiment, while achieving the same technical advantageous effects as those of the first embodiment and by making the cable modules more sophisticated, it is possible to attach and detach the cable modules more precisely and to further enhance efficiency of the services.

According to at least one aspect of the embodiments described above, under conditions where the space requirement is satisfied, it is possible, by improving the cable layout so as to avoid returning the apparatus to a factory for maintenance, to reduce maintenance time of the apparatus and to enhance efficiency of the services.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An automatic analyzing apparatus comprising:

a reagent storage;

a reaction vessel;

a placement part on which at least one of the reagent storage and the reaction vessel is placed; and a wiring fixing part detachably connected to a bottom face side of the placement part, while a wiring connected to at least one of the reagent storage and the reaction vessel is fixed to a bottom face side of the wiring fixing part.

2. The automatic analyzing apparatus according to claim 1, wherein the wiring fixing part is connected to the bottom face side of the placement part via a connecting means.

3. The automatic analyzing apparatus according to claim 2, wherein the connecting means includes: a guiding rail fixed to one of the wiring fixing part and the placement part; and a guiding groove fixed to the other.

4. The automatic analyzing apparatus according to claim 3, wherein at least one of the guiding groove and the guiding rail has, in at least one end part thereof, a slope for restricting sliding of the guiding rail in the guiding groove.

5. The automatic analyzing apparatus according to claim 1, further comprising: a position determining slope for determining a positional relationship between the placement part and the wiring fixing part.

6. The automatic analyzing apparatus according to claim 1, wherein the wiring fixing part includes a paste plane of which a first side is pasted together with the placement part, while a weld nut is fixed to a second side of the paste plane, and the weld nut is capable, when a removal screw is screwed therein, of separating the wiring fixing part and the placement part from each other.

7. The automatic analyzing apparatus according to claim 1, wherein the wiring fixing part is configured with a plurality of wiring fixing parts that are separate.

8. The automatic analyzing apparatus according to claim 7, wherein wirings including the wiring are fixed to mutually-different wiring fixing parts in correspondence with attributes thereof.

9. The automatic analyzing apparatus according to claim 1, further comprising a plurality of functional units, wherein onto the bottom face side of the wiring fixing part, a wiring connected to the plurality of functional units are fixed.

10. The automatic analyzing apparatus according to claim 1, further comprising: a position determining pin and a position determining hole for determining a positional relationship between the placement part and the wiring fixing part.

11. An automatic analyzing apparatus comprising:

a reagent storage;

a placement part on which the reagent storage is placed; and a wiring fixing part detachably connected to a bottom face side of the placement part, while a wiring connected to the reagent storage is fixed to a bottom face side of the wiring fixing part.

12. The automatic analyzing apparatus according to claim 11, wherein the wiring fixing part is connected to the bottom face side of the placement part via a connecting means.

13. The automatic analyzing apparatus according to claim 12, wherein the connecting means includes: a guiding rail fixed to one of the wiring fixing part and the placement part; and a guiding groove fixed to the other.

14. The automatic analyzing apparatus according to claim 13, wherein at least one of the guiding groove and the guiding rail has, in at least one end part thereof, a slope for restricting sliding of the guiding rail in the guiding groove.

15. The automatic analyzing apparatus according to claim 11, further comprising: a position determining slope for determining a positional relationship between the placement part and the wiring fixing part.

16. The automatic analyzing apparatus according to claim 11, wherein the wiring fixing part includes a paste plane of which a first side is pasted together with the placement part, while a weld nut is fixed to a second side of the paste plane, and the weld nut is capable, when a removal screw is screwed therein, of separating the wiring fixing part and the placement part from each other.

17. The automatic analyzing apparatus according to claim 11, wherein the wiring fixing part is configured with a plurality of wiring fixing parts that are separate.

18. The automatic analyzing apparatus according to claim 17, wherein wirings including the wiring are fixed to mutually-different wiring fixing parts in correspondence with attributes thereof.

19. The automatic analyzing apparatus according to claim 11, further comprising a plurality of functional units, wherein onto the bottom face side of the wiring fixing part, a wiring connected to the plurality of functional units are fixed.

20. The automatic analyzing apparatus according to claim 11, further comprising: a position determining pin and a position determining hole for determining a positional relationship between the placement part and the wiring fixing part.

* * * * *